United States Patent [19]

Master et al.

[11] Patent Number: 5,386,871
[45] Date of Patent: Feb. 7, 1995

[54] THERMAL ENERGY STORAGE AND RECOVERY SYSTEM

[75] Inventors: Bashir I. Master, Wayne, N.J.; Adrianus C. J. Jansen, Rijn, Netherlands

[73] Assignee: ABB Lummus Crest Inc., Bloomfield, N.J.

[21] Appl. No.: 980,671

[22] Filed: Nov. 24, 1992

[51] Int. Cl.[6] .............................. F28D 7/16
[52] U.S. Cl. .................... 165/10; 165/145; 165/157
[58] Field of Search .............. 165/10, 10 A, 145, 157

[56] References Cited

U.S. PATENT DOCUMENTS

| | | | |
|---|---|---|---|
| 3,373,802 | 3/1968 | Wiklund et al. | 165/157 X |
| 3,796,547 | 3/1974 | Muenger | 165/157 X |
| 4,060,127 | 11/1977 | Savin et al. | 165/145 |

OTHER PUBLICATIONS

G. P. Purohit; "Thermal and Hydraulic Design of Hairpin and and Finned-bundle Exchangers"; Chemical Engineering, May 16, 1983, pp. 62–70.

*Primary Examiner*—Stephen M. Hepperle
*Attorney, Agent, or Firm*—Chilton, Alix & Van Kirk

[57] ABSTRACT

A heat storage apparatus is disclosed providing a vertical tube bundle arrangement in a vessel containing a heat storage medium. The tube bundle is divided into modular sector-shaped units each having a radial distribution manifold at the bottom and top with each radial distribution manifold having a plurality of perpendicular secondary manifolds to which the heat exchange tubes are attached. The modular units are supported on radial beams which support the units by the secondary manifolds. Alternate means may be used to feed the fluid through the tubes.

9 Claims, 4 Drawing Sheets

THERMAL ENERGY STORAGE AND RECOVERY SYSTEM

BACKGROUND OF THE INVENTION

The present invention relates to a thermal energy storage and recovery system and more particularly to the arrangement and support of modular tube bundles in a heat sink tank.

There are many situations and processes in which excess heat energy is generated at certain periods of time and heat energy is required at other periods of time. In order to obtain the benefits of excess energy during periods when energy is required, it is common to store the heat energy in some form of storage device or heat sink from which the heat energy can be readily recovered as needed. In conventional designs, bare or finned tube heating coils are placed either in vertical or horizontal arrangements to discharge the excess heat from a fluid inside the tubes to a reservoir of cold fluid outside the tubes. Large and often expensive manifolding systems are required for such systems. Horizontal mounting of the tubes often requires tube sheets to form the tube bundle.

SUMMARY OF THE INVENTION

The object of the present invention is to provide a vertical tube bundle arrangement for a thermal energy storage and recovery system with a simplified manifolding and support arrangement. The manifold arrangement permits a compact bundle layout and the modular concept permits savings in fabrication, assembly and replacement parts. Also, large capacity units can be assembled on site from prefabricated modular tube bundles.

In particular, each module is sector-shaped and has radial distribution manifolds at the bottom and top. Extending perpendicular to the bottom and top radial distribution manifolds are a plurality of secondary manifolds with the heat exchange tubes extending between the bottom and top secondary manifolds.

DESCRIPTION OF THE PREFERRED EMBODIMENTS

Figure 1:
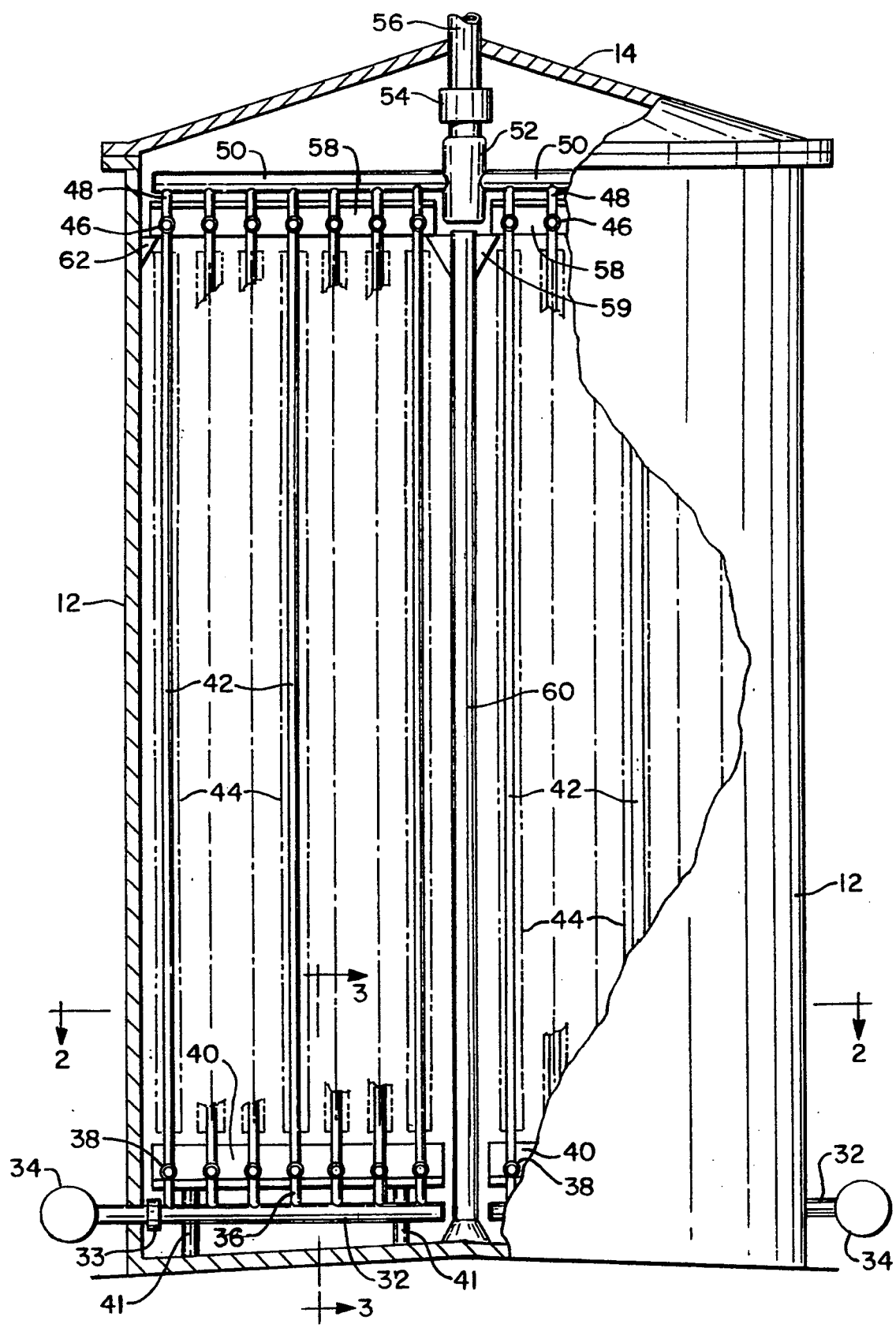
FIG. 1 is a vertical cross-section of the thermal energy storage and recovery system of the present invention.
Figure 2:
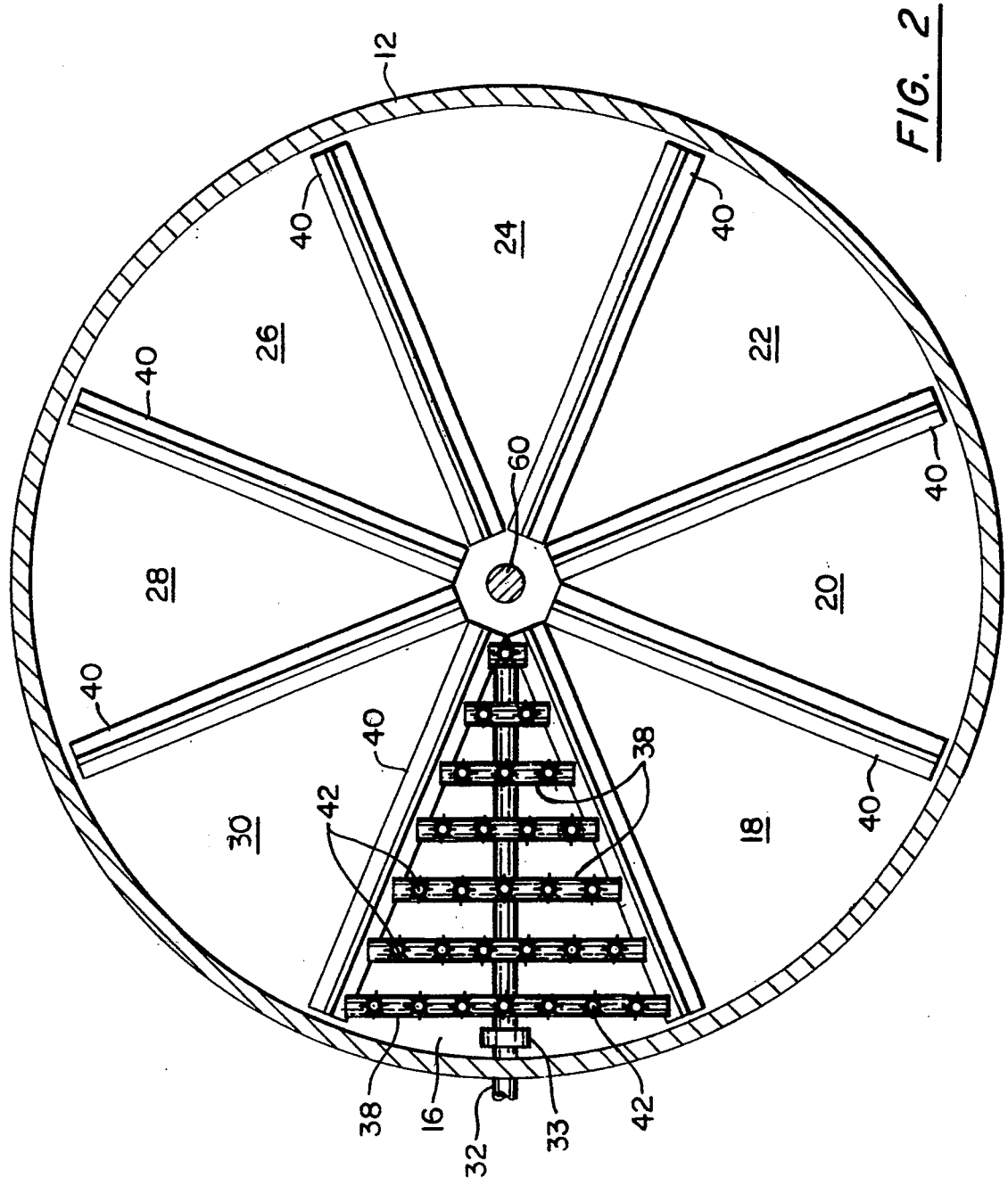
FIG. 2 is a horizontal cross sectional view taken along line 2—2 of FIG. 1.

Referring to the drawings, FIGS. 1 and 2 show a tank 12 which includes a removable roof 14. This tank 12 contains a heat storage medium such as a molten salt mixture of sodium and potassium nitrates in various proportions depending upon the specific application. Mounted within the tank 12 is the unique arrangement of heat exchange surface of the present invention. This heat exchange surface is arranged in individual modules with each module being located within a pie-shaped sector. These sectors are identified on FIG. 2 as 16, 18, 20, 22, 24, 26, 28 and 30. Although eight sectors have been illustrated, the apparatus may be divided into any desired number of sectors depending upon such factors as the size of the unit and fabrication and assembly considerations. Also, although the tank 12 has been illustrated as being circular in cross-section, it can be other shapes. For example, an octagonal shape may be particularly adapted to a unit in which there are eight sectors.

Figure 3:
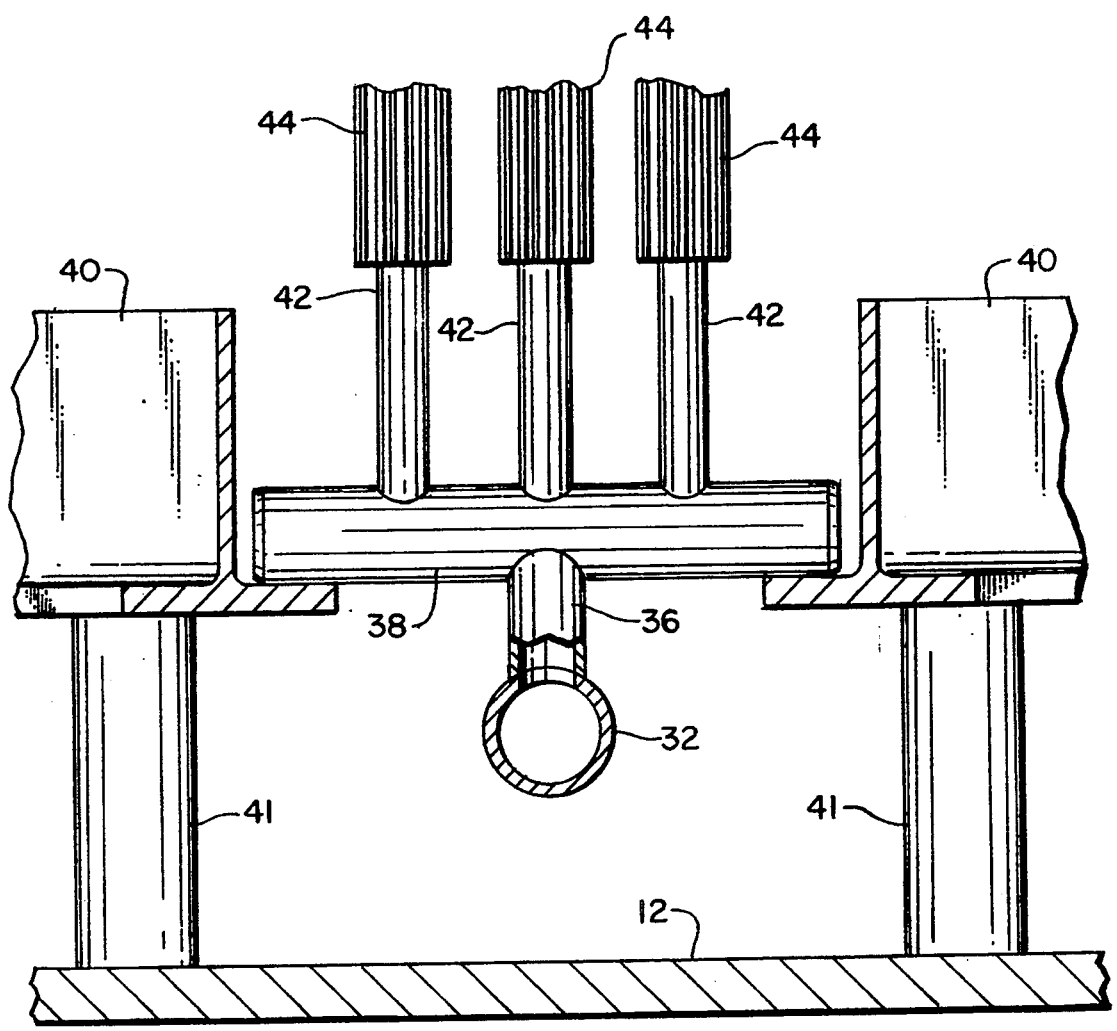
FIG. 3 is a detailed view taken generally along line 3—3 of FIG. 1.

The heat exchange modules are each formed from a radial distribution manifold 32 which extends through the tank 12 with all of these radial distribution manifolds 32 being connected to a peripheral ring manifold 34. An expansion joint 33 would typically be located in the manifolds 32 as shown in FIGS. 1 and 2. Connected to the radial distribution manifold 32 by means of the short connection nipples 36 are a plurality of manifolds 38 which extend perpendicular to the radial distribution manifold 32 across the sector. These manifolds 38 may be referred to as secondary manifolds. Although seven manifolds 38 have been illustrated, any desired number may be used. This manifold structure is supported in the tank 12 by means of the radially extending support beams 40 on which the manifolds 38 are supported. The support beams 40 are supported from the tank floor by the posts 41. Attached to the top of the manifolds 38 are the heat transfer tubes 42. These heat transfer tubes 42 preferably have extended heat exchange surface generally in the form of vertically extending fins 44 attached to and extending outwardly from the tube walls as best seen in FIG. 3. This external extended heat exchange surface greatly enhances the heat transfer and reduces the number of tubes required for a given heat storage capacity as compared to a conventional bare tube design. Also, the vertical orientation of the fins facilitates the natural convection currents within the heat storage medium in the tank thus aiding the heat transfer.

The top ends of the heat transfer tubes 42 are connected to a manifolding system which is basically identical to the manifolding system at the bottom. The tops of the tubes 42 are connected to the respective manifolds 46 corresponding to the manifolds 38 at the bottom. The corresponding secondary manifolds on the bottom and the top form manifold pairs. These manifolds 46 are then connected by the short nipples 48 to the top radial distribution manifolds 50. These manifolds 50 are then connected to the top center manifold 52 which is connected through the expansion joint 54 to the exit pipe 56. The expansion joint 54 permits and accommodates the differential thermal expansion between the heat transfer tubes 42 and the tank 12.

In order to align the upper ends of the heat exchange modules in each sector, upper radial structural members or alignment beams 58 extend radially between sectors and between the modules in adjacent sectors to maintain the upper ends in the proper position. These radial structural members 58 are similar to the support beams 40 except that they do not support the weight of the modules. They merely extend between modules and permit the modules to move up and down upon thermal expansion and contraction These structural members 58 are supported in position by the brackets 59 on the central column 60 and by the brackets 62 on the tank walls.

Figure 4:
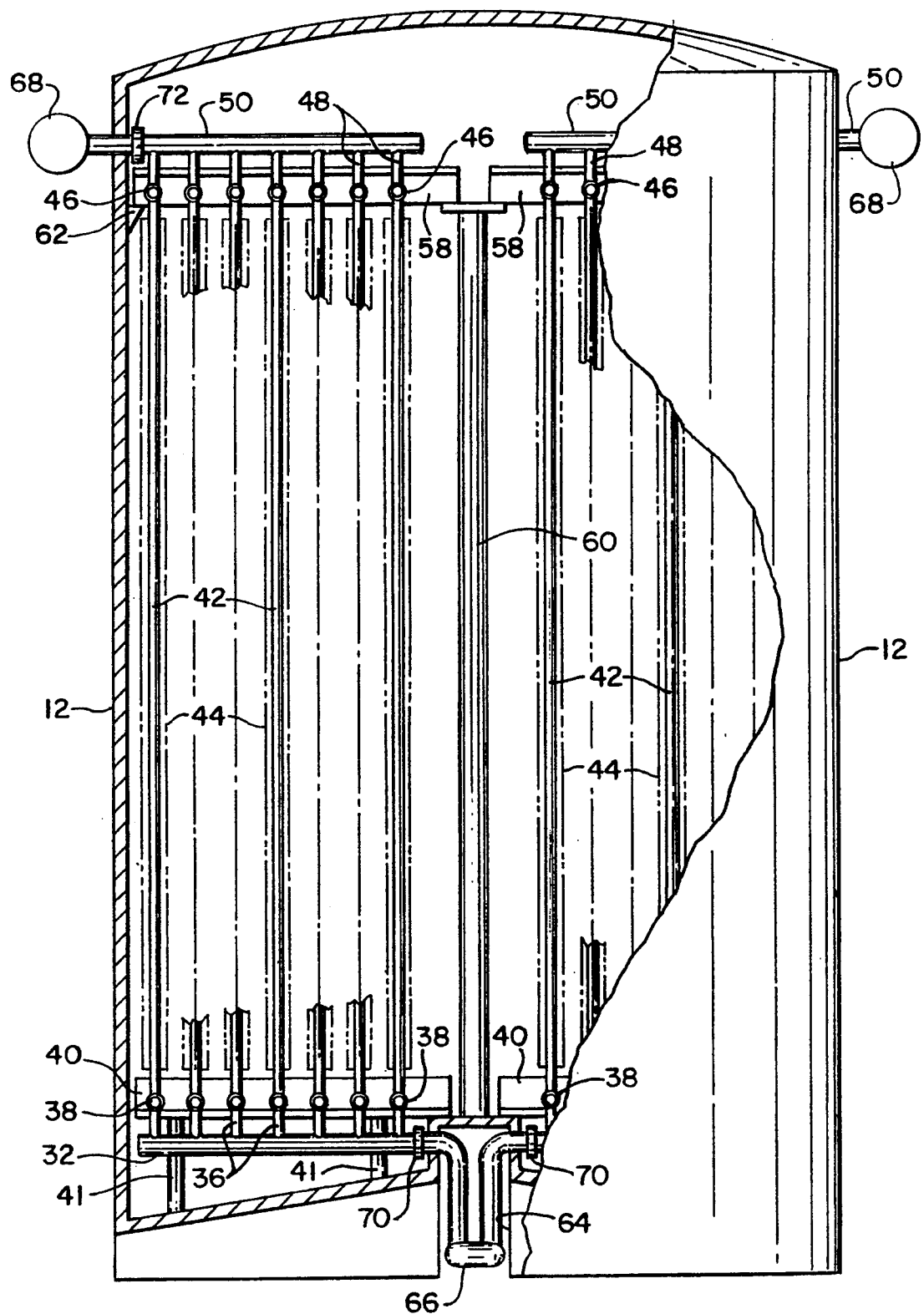
FIG. 4 illustrates an embodiment of the present invention involving a modified manifold arrangement.

Referring now to FIG. 4, a modified manifolding arrangement is shown. In this arrangement, the radial distribution manifolds 32 extend inwardly into a well or pit 64 under the center of the tank. These manifolds 32 in this arrangement turn downwardly in the well and are attached to the manifold 66. At the top, the manifolds 50 extend out through the side of the tank 12 and are connected to the manifold 68. Expansion joists are located as needed such as at 70 and 72.

The manifold system of the present invention permits a compact bundle layout with the most economical utilization of the heat storage volume. Also, the individual bundles are identical in geometry and thus interchangeable. This results in a savings in the cost of fabrication and assembly and minimizes the number of spare parts required. To remove a bundle from a sector, it is only necessary to cut the radial manifolds for that sector and then lift the bundle out the top. Furthermore, valves may be installed in the supply and discharge manifolds for each bundle to isolate bundle sectors for maintenance and part load operation.

During operation in the charge or heat storage cycle, the heating fluid such as steam is introduced into the system at the top. As the heat is transferred to the heat storage medium, the steam condenses and is collected and discharged out the bottom. The natural convection currents in the heat storage medium enhance this heat transfer. During the discharge cycle, the cold fluid, normally feedwater, would be introduced at the bottom with the steam that is generated being discharged at the top.

We claim:

1. Heat storage apparatus comprising:
   a. a vertically oriented vessel having a generally circular cross-section and having a vertically oriented centerline, said vessel adapted to contain a heat storage medium;
   b. a plurality of sector-shaped heat exchange modules located adjacent to each other around said centerline; each module comprising:
      i. a bottom radially extending horizontal distribution manifold located at the bottom of said module and a top radially extending horizontal distribution manifold located at the top of said module;
      ii. a plurality of bottom secondary horizontal manifolds extending perpendicular and connected to said bottom radially extending distribution manifold by vertical connecting means and a plurality of top secondary horizontal manifolds extending perpendicular and connected to said top radially extending distribution manifold by vertical connecting means whereby respective ones of said bottom and top secondary manifolds form manifold pairs;
      iii. a plurality of vertically extending heat exchange tubes extending between each of said manifold pairs;
      iv. radially extending bottom support beams extending between each pair of adjacent modules and extending partially under said bottom secondary manifolds whereby said modules are supported on said radially extending bottom support beams by said bottom secondary manifolds;
      v. radially extending top alignment beams extending between each pair of adjacent modules and adapted to align the top of each module;
      vi. a support column extending along said vertically oriented centerline, said support column being supported at the bottom end thereof and including means at the top end thereof adapted to support said top alignment beams;
      vii. means for feeding a fluid into and out of said bottom and top radially extending horizontal distribution manifolds whereby said fluid flows vertically through said connecting means and horizontally through bottom and top secondary manifolds and vertically through said heat exchange tubes in heat exchange relationship with the heat storage medium thereby forming a flow path for said fluid which permits gravity drainage of condensate out through said bottom radially extending horizontal distribution manifolds.

2. Heat storage apparatus as recited in claim 1 wherein said means for feeding fluid into and out of said bottom radially extending distribution manifolds includes means extending radially outwardly therefrom through said vessel.

3. Heat storage apparatus as recited in claim 2 and further including expansion joints connecting said bottom radially extending distribution manifolds to said means extending through said vessel.

4. Heat storage apparatus as recited in claim 3 wherein said means for feeding fluid into and out of said top radially extending distribution manifolds includes a top central manifold to which said top radially extending distribution manifolds are connected and further includes a pipe connected to said central manifold through an expansion joint and extending outwardly through said vessel generally along the centerline.

5. Heat storage apparatus as recited in claim 1 wherein said means for feeding fluid into and out of said bottom radially extending distribution manifold includes means extending inwardly therefrom and out the bottom of said vessel.

6. Heat storage apparatus as recited in claim 5 and further including expansion joints connecting said bottom radially extending distribution manifolds to said means extending inwardly and out the bottom of said vessel.

7. Heat storage apparatus as recited in claim 1 wherein said means for feeding fluid into and out of said top radially extending distribution manifolds includes means extending radially outward therefrom through said vessel.

8. Heat storage apparatus as recited in claim 7 and further including expansion joints connecting said top radially extending distribution manifolds to said means extending radially outward therefrom through said vessel.

9. Heat storage apparatus as recited in claim 1 wherein said heat exchange tubes include longitudinally oriented extended heating surface.

* * * * *

UNITED STATES PATENT AND TRADEMARK OFFICE
CERTIFICATE OF CORRECTION

PATENT NO. : 5,386,871
DATED : February 7, 1995
INVENTOR(S) : Bashir I. Master et al It is certified that error appears in the above-indentified patent and that said Letters Patent is hereby corrected as shown below:

Claim 7, column 4, line 47, change "1" to --5--.

Signed and Sealed this

Second Day of May, 1995

Attest:

BRUCE LEHMAN

Attesting Officer

Commissioner of Patents and Trademarks